T. SAWATZKY.
PLOW.
APPLICATION FILED JULY 24, 1908.
901,193.
Patented Oct. 13, 1908.
2 SHEETS—SHEET 1.
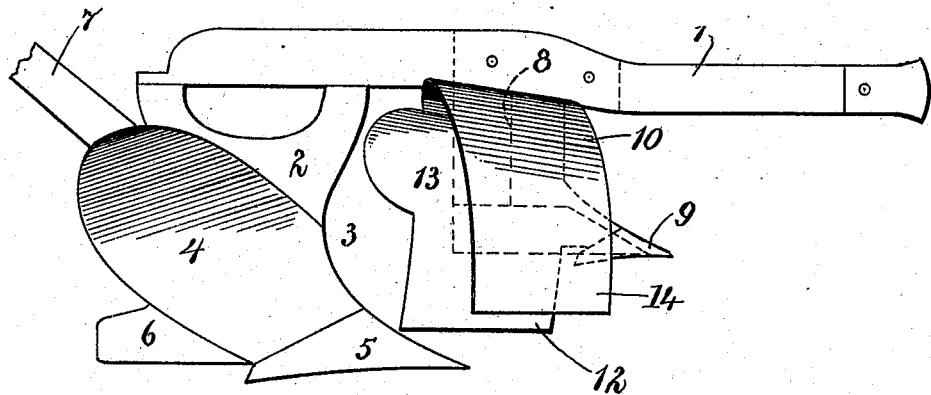
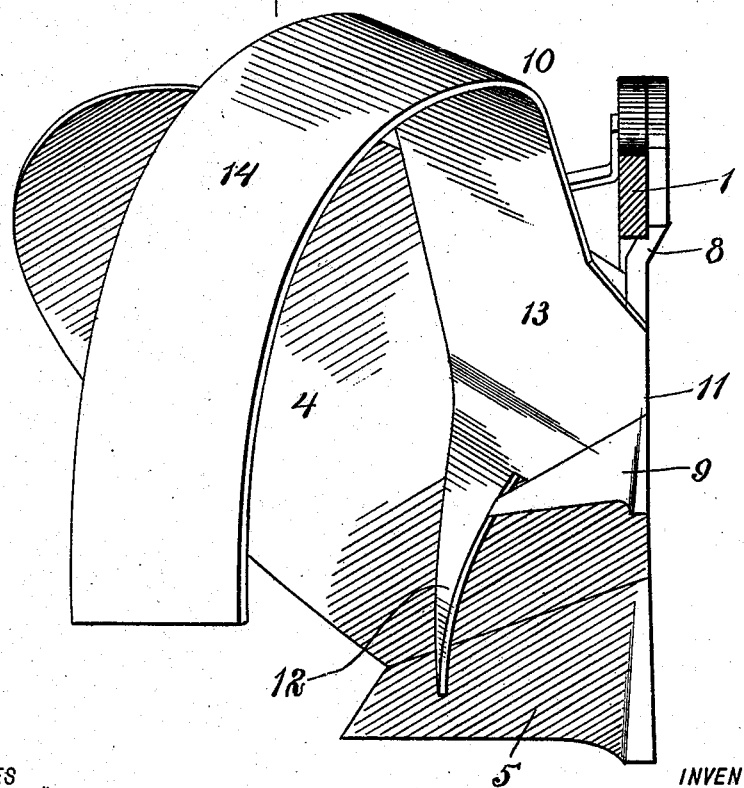
WITNESSES
INVENTOR
Thomas Sawatzky
BY
ATTORNEYS

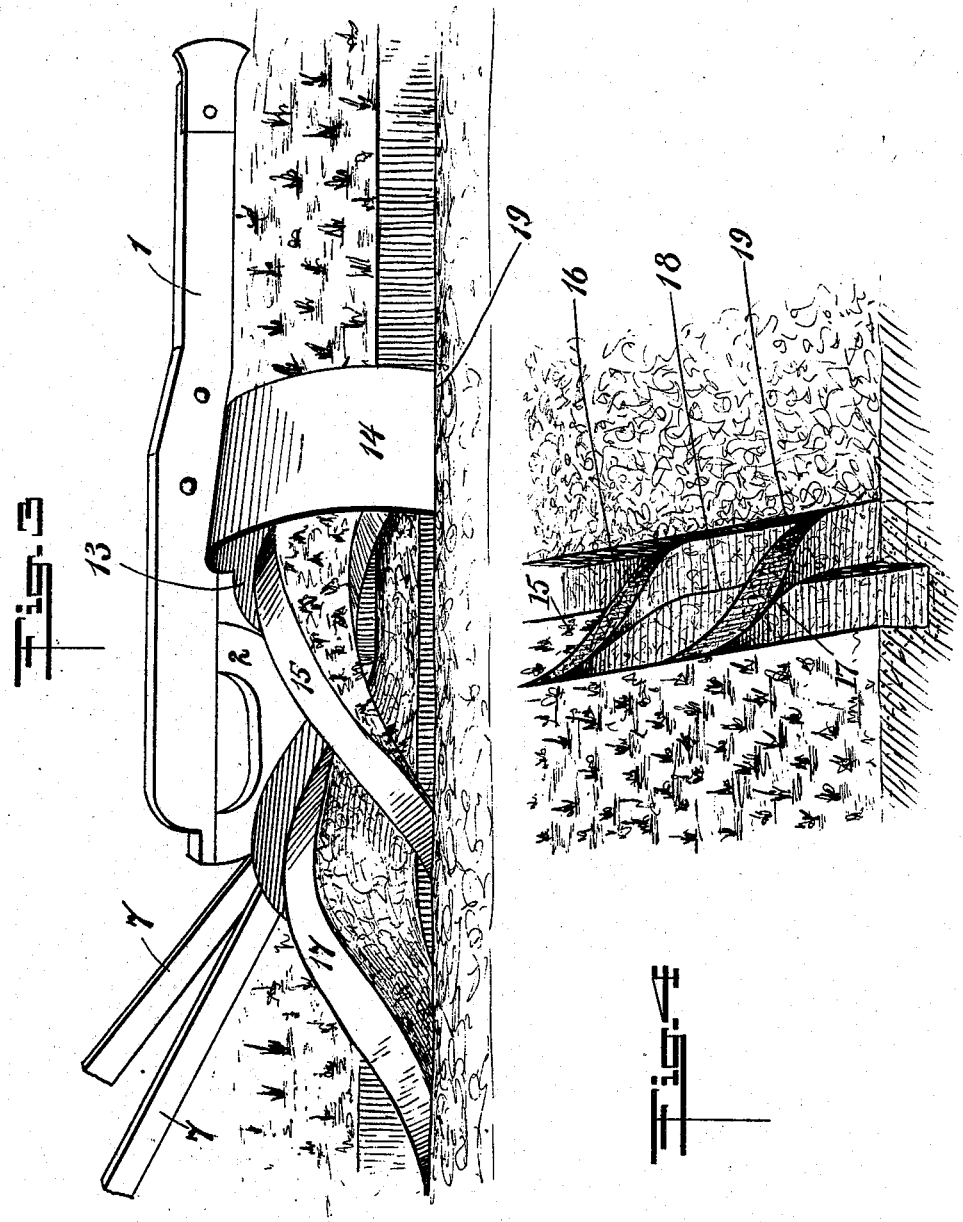

UNITED STATES PATENT OFFICE.

THOMAS SAWATZKY, OF HERBERT, SASKATCHEWAN, CANADA.

PLOW.

No. 901,193.　　　　Specification of Letters Patent.　　　　Patented Oct. 13, 1908.

Application filed July 24, 1908. Serial No. 445,108.

*To all whom it may concern:*

Be it known that I, THOMAS SAWATZKY, a citizen of the British Empire, and a resident of Herbert, in the Province of Saskatchewan and Dominion of Canada, have invented a new and Improved Plow, of which the following is a full, clear, and exact description.

This invention relates to plows.

The object of the invention is to produce a plow which will be constructed in such a way as to form two slices as it passes through the earth, one from the surface soil and one from the sub-soil. In this way the plow operates to cut an unusually deep furrow, and the slice of surface soil is turned into the bottom of this furrow and the slice of sub-soil is deposited above this by the rear part of the plow; in this way seeds and weeds are completely buried, while the rich sub-soil is brought to the surface.

The invention concerns itself especially with the construction of the mold-board of the forward plow which turns the surface soil.

One of the purposes of the invention is to construct this mold-board in such a way that it will operate effectively to guide the lower slice in position.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a side elevation of a plow constructed according to my invention, the handle being shown broken away; Fig. 2 is a vertical section taken through the plow beam just forward of the forward plow and upon an enlarged scale; Fig. 3 is a perspective showing the plow from the side and illustrating the manner in which it operates, in this view the handles are represented as broken away; and Fig. 4 is a perspective showing the manner in which the plow forms a furrow and the manner in which it turns the slices of sub-soil and surface soil.

Referring more particularly to the parts, 1 represents the beam of the plow which may be of any common form, such as that shown. At the rear this beam is provided with a sheath 2 to which the rear plow 3 is attached, said rear plow comprising a mold-board 4, a share 5, and a land-side 6. To the sheath 2 the handles 7 of the plow are attached, as indicated. At an intermediate point on the length of the beam, a forward sheath 8 is attached, and to the lower part of this sheath a share 9 is attached. To the rear of the share 9, a forward mold-board 10 is attached, the lower part of the sheath is formed into a land-side 11, as indicated. The plowshare 9 is disposed at a higher elevation than the share 5, so that when the plow is in operation the share 5 cuts to a much greater depth into the soil, that is, it forms a slice from the sub-soil, while the share 9 forms its slice from the surface soil.

The mold board is formed as shown in Figs. 1 and 2. Just to the rear of the share 9, it is formed with a downwardly projecting guide fin 12 which is curved and offset outwardly of the plane of the land-side, as shown. The body 13 of this mold-board inclines upwardly and outwardly from the land-side and is formed into a curved bow or horn 14, as indicated.

The manner in which the plow operates will be clearly understood from an inspection of Figs. 3 and 4. Referring to Fig. 4, it will be seen that the forward plow forms a slice 15 from the surface soil and this is turned over into the last furrow 16 which the plow has formed. Just behind this slice 15, the slice 17 is formed from the sub-soil by the rear plow and turned over onto the slice 15 as it lies in the furrow 16. The guide wing 12 runs in the space 18 between the two furrows and lies against the land-side of the furrow 16 as a guide. The horn 14 extends completely over to the outer side 19 of the furrow 16 and runs along adjacent to this point so as to operate as a guard and guide. The slice 15 as it is raised from the earth, slides upwardly on the inclined body 13 of the mold-board 10 and on account of the peculiar form of the mold-board is turned over completely and passes toward the right into the furrow 16 just to the rear of the horn 14, as shown. In this way the fin 12 and the horn 14 effectively act as guides for the forward plowshare 9 and hold it in proper alinement with the rear plow or plowshare 5.

Having thus described my invention, I claim as new and desire to secure by Letters Patent,—

1. In combination, a plow beam having a rear plow adapted to raise the sub-soil, and a forward plow adapted to raise the surface soil, said forward plow having a mold-board with a guide wing projecting downward and offset from the land-side of said forward plow and lying adjacent to the inner side of the furrow lying at the right of the plow, said mold-board having an upwardly and outwardly bent horn, the extremity whereof lies adjacent to the outer side of the said furrow at the right of the plow.

2. In combination, a plow beam having a rear plow adapted to raise and turn the subsoil, and a forward plow, having a mold-board formed with a curved plate, said plate having its lower portion offset laterally from the land-side thereof and extending downward to form a fin running on the face of the furrow at the side of the plow, said mold-board having an outwardly curved horn extending downwardly and running on the outer side of the said furrow at the side of the plow.

In testimony whereof I have signed my name to this specification in the presence of two subscribing witnesses.

THOMAS SAWATZKY.

Witnesses:
  Isaac S. Wiens,
  Wilhelm Janzen.